No. 848,491. PATENTED MAR. 26, 1907.
L. J. PHILLIPS.
ALARM ATTACHMENT FOR SELF BINDERS.
APPLICATION FILED OCT. 13, 1906.
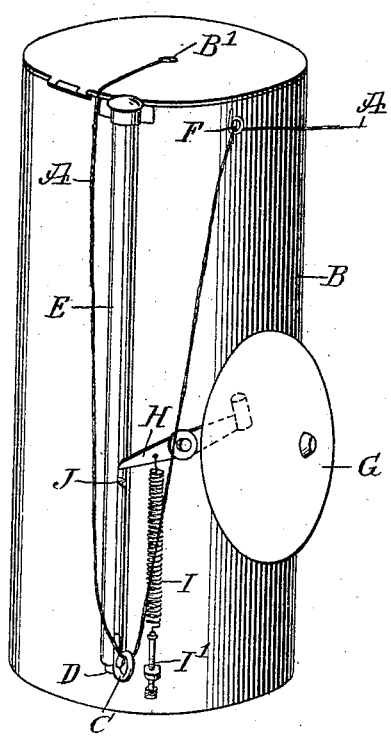
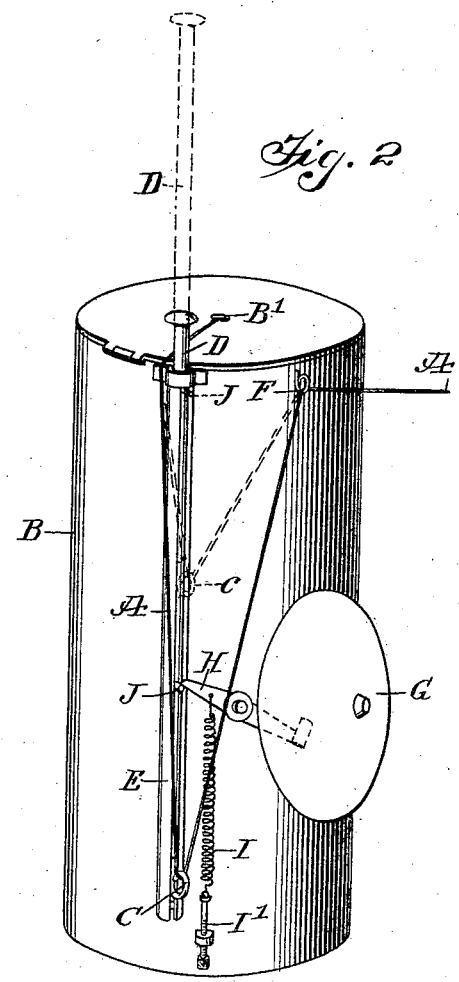
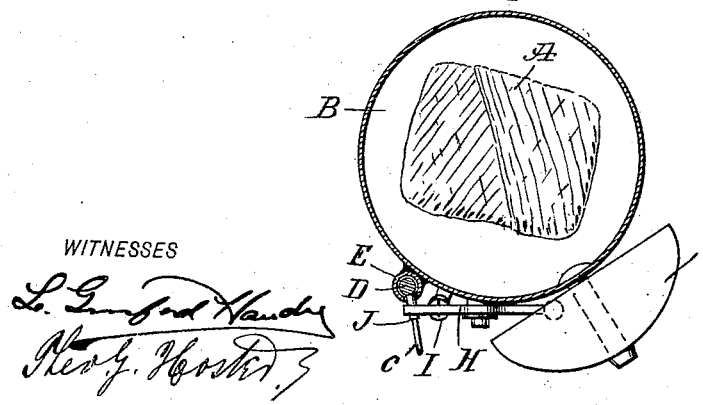
WITNESSES
INVENTOR
Lewis J. Phillips
BY
ATTORNEYS
THE NORRIS PETERS CO., WASHINGTON, D. C.

UNITED STATES PATENT OFFICE.

LEWIS J. PHILLIPS, OF FOSS, OKLAHOMA TERRITORY.

ALARM ATTACHMENT FOR SELF-BINDERS.

No. 848,491.   Specification of Letters Patent.   Patented March 26, 1907.

Application filed October 13, 1906. Serial No. 338,759.

*To all whom it may concern:*

Be it known that I, LEWIS J. PHILLIPS, a citizen of the United States, and a resident of Foss, in the county of Washita and Territory of Oklahoma, have invented a new and Improved Alarm Attachment for Self-Binders, of which the following is a full, clear, and exact description.

The invention relates to self-binding harvesters; and its object is to provide a new and improved alarm attachment for self-binders arranged to give a signal or alarm to the driver to stop the harvester in case the twine knots or is for other reasons prevented from feeding properly and as called for by the binding mechanism, and to allow sufficient twine to pass through the binding mechanism for completing the binding of the grain in the harvester at the time, and to prevent the twine from being broken, thus requiring no rethreading of the twine.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement, showing the parts in normal working position. Fig. 2 is a like view of the same, showing the parts in position after giving the alarm; and Fig. 3 is a sectional plan view of the improvement.

The twine A, contained in a twine-holding receptacle B, extends through an eye B', formed in the cover B² of the receptacle B, and the twine then passes downward and through an eye C, formed or secured on a rod D, mounted to slide in suitable bearing E, shown attached to the outside of the receptacle B. The twine after leaving the eye C passes upward and through an eye F, arranged at or near the top of the receptacle B, as plainly indicated in Figs. 1 and 2, and the twine then passes from this eye F to the binder mechanism to bind the grain into sheaves in the usual manner. On the outside of the receptacle B is mounted an alarm, preferably in the form of a bell G, having a hammer H for sounding the bell, the hammer being in the form of a lever fulcrumed on the receptacle B and pressed on by a spring I, the tension of which can be regulated by a suitable screw I' or other means. The free end of the hammer H extends into the path of a projection J, secured to or formed on the rod D a distance above the eye C, as plainly indicated in Fig. 1.

Normally the several parts are in the position as illustrated in Fig. 1, so that the twine A can readily pass from the twine-holding receptacle B to the binder mechanism to be used for tying the grain into sheaves in the usual manner. Now in case the twine becomes knotted within the receptacle B, and hence does not feed properly, then the pull exerted on the twine by the binder mechanism causes an upward pull on the eye C, so that the rod D is moved upwardly in its bearing E, and the projection J engages and imparts a swinging motion to the hammer H against the tension of the spring I. The projection J in its upward movement finally passes the free end of the hammer H, so that the latter is quickly returned by the action of the spring I, and consequently the hammer H sounds the bell G, thus giving a signal or alarm to the driver of the harvester, to stop the latter.

From the foregoing it will be seen that the alarm or signal and the means for actuating the same are located intermediate the twine-holding receptacle B and the binder mechanism, and the twine is used to actuate the said means and the latter to actuate the alarm in case the twine is prevented from feeding properly—that is, when the twine becomes knotted in the twine-holding receptacle B or other causes prevent the twine from passing freely out of the receptacle B to the binder mechanism.

As the projection J is directly under the free end of the hammer H, the latter is actuated and the alarm is sounded immediately after the rod D begins to slide upward; but as the harvester does not come immediately to a standstill provision is made to allow the rod D to slide further upward in the bearing E to bring the eye C nearer to the eyes B' and F, thus permitting a sufficient length of twine to pass to the binder mechanism to bind the grain contained in the harvester at the time.

The pull exerted by the binder mechanism on the twine A is ordinarily not sufficient to lift the rod D and lug J against the tension of the spring I, holding the free end of the hammer H in contact with the projection J; but when the twine in the receptacle B is held against further feeding then the pull on the twine by the binder mechanism causes the twine to lift the rod D for sounding the alarm and for still feeding a length of the twine to the binder mechanism until the harvester comes to a standstill. It will further be noticed that by the movement of the rod D, as described, the twine is not liable to break, and consequently a tedious rethreading of the twine is not required. After the operator stops the machine the twine contained in the receptacle B can be readily put into proper shape, after which the rod D is returned to its normal position. (Shown in Fig. 1.)

Having thus described my invention, I claim as new and desire to secure by Letters Patent—

1. An alarm attachment for self-binding harvesters comprising a twine-holding receptacle, a rod mounted to slide on the outside of the said receptacle, the rod having an eye for the passage of the twine from the said twine-holding receptacle to the binding mechanism of the harvester, said eye being out of the direct line of the passage of the twine from the twine-holding receptacle to the binding mechanism, an alarm, and means whereby it is actuated by the said rod on the latter being moved by the twine at the time the latter is held against movement in the twine-holding receptacle.

2. An alarm attachment for self-binding harvesters comprising a twine-holding receptacle, a rod mounted to slide on the outside of the said receptacle, the rod having an eye for the passage of the twine from the said twine-holding receptacle to the binding mechanism of the harvester, and an alarm comprising a bell and a spring-pressed hammer for the same, and adapted to be engaged by a projection on the said rod.

In testimony whereof I have signed my name to this specification in the presence of two subscribing witnesses.

LEWIS J. PHILLIPS.

Witnesses:
J. I. HOWARD,
F. R. MURPHY.